United States Patent
Evers et al.

(10) Patent No.: US 11,427,239 B2
(45) Date of Patent: Aug. 30, 2022

(54) METHOD AND SYSTEM FOR VALIDATING AN OBSTACLE IDENTIFICATION SYSTEM

(71) Applicant: SIEMENS MOBILITY GMBH, Munich (DE)

(72) Inventors: Bernhard Evers, Braunschweig (DE); Jens Braband, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 1007 days.

(21) Appl. No.: 16/089,681

(22) PCT Filed: Mar. 1, 2017

(86) PCT No.: PCT/EP2017/054757
§ 371 (c)(1),
(2) Date: Sep. 28, 2018

(87) PCT Pub. No.: WO2017/167528
PCT Pub. Date: Oct. 5, 2017

(65) Prior Publication Data
US 2019/0118842 A1    Apr. 25, 2019

(30) Foreign Application Priority Data
Mar. 31, 2016 (DE) .................. 10 2016 205 392.2

(51) Int. Cl.
*G06V 10/00* (2022.01)
*B61L 27/60* (2022.01)
(Continued)

(52) U.S. Cl.
CPC ............ *B61L 27/60* (2022.01); *B61L 23/041* (2013.01); *B61L 23/047* (2013.01);
(Continued)

(58) Field of Classification Search
CPC ...... B61L 27/60; B61L 23/041; B61L 23/047; B61L 27/04; G06V 20/58; G06V 10/98; G06K 9/6262; G09B 9/04
(Continued)

(56) References Cited

U.S. PATENT DOCUMENTS

| 9,286,525 B2 | 3/2016 | Nentwig |
| 2011/0184895 A1* | 7/2011 | Janssen .................. G06V 20/54 706/12 |

FOREIGN PATENT DOCUMENTS

| CN | 105035322 A | 11/2015 |
| CN | 105241457 A | 1/2016 |

(Continued)

OTHER PUBLICATIONS

Thomas Helmer, Lei Wang, Klaus Kompass, and Ronald Kates, 2015, IEE 18th Conference on Intelligent Transportation Systems, whole document. (Year: 2015).*

*Primary Examiner* — Tyler J Lee
*Assistant Examiner* — Tiffany P Ohman
(74) *Attorney, Agent, or Firm* — Laurence A. Greenberg; Werner H. Stemer; Ralph E. Locher

(57) ABSTRACT

A method validates an obstacle identification system. In order to be able to demonstrate that obstacles are identified by an obstacle identification system at least as reliably as by a driver, it is provided that, in order to form driving scenarios, stochastic combinations of prespecified distributions of submodules are provided. The provided combinations are subjected first, for carrying out a simulation study, to simulation by a simulator and second to automatic processing by an obstacle identification algorithm of the obstacle identification system, and a result of a simulation
(Continued)

study, which is carried out by the simulator, and a result of the automatic processing are automatically tested for agreement.

18 Claims, 1 Drawing Sheet

(51) Int. Cl.
*B61L 23/04* (2006.01)
*G06K 9/62* (2022.01)
*G06V 10/98* (2022.01)
*G06V 20/58* (2022.01)
*G09B 9/04* (2006.01)
*B61L 27/04* (2006.01)

(52) U.S. Cl.
CPC ............ *G06K 9/6262* (2013.01); *G06V 10/98* (2022.01); *G06V 20/58* (2022.01); *G09B 9/04* (2013.01); *B61L 27/04* (2013.01)

(58) Field of Classification Search
USPC .............................................................. 703/8
See application file for complete search history.

(56) References Cited

FOREIGN PATENT DOCUMENTS

| | | |
|---|---|---|
| DE | 102008001256 A1 | 10/2009 |
| EP | 1868051 A1 | 12/2007 |
| EP | 2546778 A2 | 1/2013 |
| WO | 2004028881 A1 | 4/2004 |
| WO | 2014183948 A2 | 11/2014 |
| WO | 2015015494 A1 | 2/2015 |

\* cited by examiner

METHOD AND SYSTEM FOR VALIDATING AN OBSTACLE IDENTIFICATION SYSTEM

BACKGROUND OF THE INVENTION

Field of the Invention

For autonomous running on line sections that are characterized by mixed traffic, i.e. traversed by freight trains and express trains (main lines), obstacle identification is very important.

Obstacle identification systems having a vehicle-based obstacle identification arrangement and/or a trackside obstacle identification arrangement are known.

SUMMARY OF THE INVENTION

The invention relates to a method and a system for validating an obstacle identification system, the object of the invention being to design these in such a way that it is possible to verify that obstacles are identified by an obstacle identification system at least as reliably as by a driver.

This object is achieved by a method according to the main method claim, in which stochastic combinations of predetermined distributions from submodels are provided for the purpose of forming driving scenarios, the provided combinations are subjected both to simulation by a simulator in order to perform a simulation study and to automatic processing by an obstacle identification algorithm of the obstacle identification system, and a result of a simulation study performed by the simulator and a result of the automatic processing are automatically tested for agreement.

Said object is also achieved by a system according to the main system claim, which is suitably designed to provide stochastic combinations of predetermined distributions from submodels for the purpose of forming driving scenarios, to subject the provided combinations both to simulation by a simulator in order to perform a simulation study and to automatic processing by an obstacle identification algorithm of the obstacle identification system, and automatically to test a result of a simulation study performed by the simulator and a result of the automatic processing for agreement.

The advantage of the inventive method and the inventive system consist in the automation of the validation by means of combining the various submodels and in the automatic matching of the result of the simulation study with the result of the automatic processing by the obstacle identification algorithm (i.e. with a technical validation result or, if improvements to the obstacle identification algorithm are required, with further technical validation results). This allows the validation to be significantly shortened and/or the expense of the validation to be significantly reduced.

With regard to the method, it is considered advantageous to stochastically combine the submodels in a combined model and to provide the stochastic combinations from the combined model. It is therefore advantageous to assign a combined model, in which the submodels are stochastically combined and which is suitably designed to provide the stochastic combinations.

With regard to the method, it is further considered advantageous for the driving scenarios to be to be displayed graphically by the simulator, in particular as virtual reality, during the simulation. Accordingly, with regard to the system, it is advantageous for the simulator to be suitably designed to display the driving scenarios graphically during the simulation, in particular as virtual reality.

With regard to the method, it is also considered advantageous, as a result of the simulation study during which the submodels and/or the combined model are validated and applied by means of simulation runs that are performed at the simulator by test users, in particular locomotive drivers, for a first result representing the obstacle identification capability of the test users to be output, and therefore for the system to be suitably designed to output, as a result of the simulation study during which the submodels and/or the combined model are validated and applied by means of simulation runs that are performed at the simulator by test users, in particular locomotive drivers, a first result representing the obstacle identification capability of the test users.

With regard to the method, it is further considered advantageous, as a result of the automatic processing, for a second result representing the obstacle identification capability of the obstacle identification algorithm to be output, and therefore for the system to be suitably designed to output, as a result of the automatic processing, a second result representing the obstacle identification capability of the obstacle identification algorithm.

A line section model, a weather and environment model, and an obstacle model are preferably used as submodels.

It is moreover advantageous for further predetermined distributions of a further submodel to be subjected to the automatic processing by the obstacle identification algorithm. The further submodel can be a model for the performance capability of sensors of the obstacle identification system.

BRIEF DESCRIPTION OF THE SEVERAL VIEWS OF THE DRAWING

The invention is explained in greater detail below with reference to the figures, in which.

DESCRIPTION OF THE INVENTION

Figure 1:
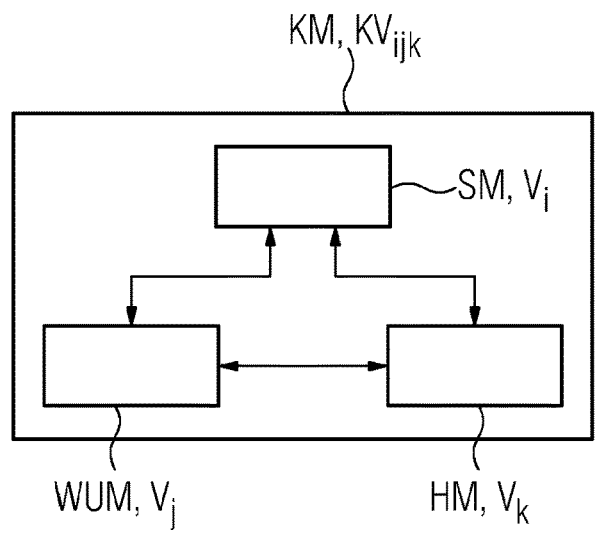
FIG. 1 shows a combined model in which submodels are stochastically combined.

According to FIG. 1, a combined model KM is provided in which three submodels SM, WUM and HM are stochastically combined.

The combined model KM provides stochastic combinations $KV_{ijk}$ of predetermined distributions $V_i$, $V_j$, $V_k$ of the submodels SM, WUM and HM for the purpose of forming driving scenarios.

The submodels comprise a line section model SM with the predetermined distributions $V_i$, a weather and environment model WUM with the predetermined distributions $V_j$ and an obstacle model HM with the predetermined distributions $V_k$.

The line section model SM corresponds to a reference line section model as used in advanced simulators today, i.e. highly complex quasi-natural simulators.

The weather and environment model WUM is used to define credible but otherwise rather difficult combinations of time of day, weather, etc., as well as combinations of temporary operating conditions such as temporary speed restrictions, for example.

The obstacle model HM consists of models of all obstacles that could realistically be encountered, such as trees, animals and people, for example.

Figure 2:
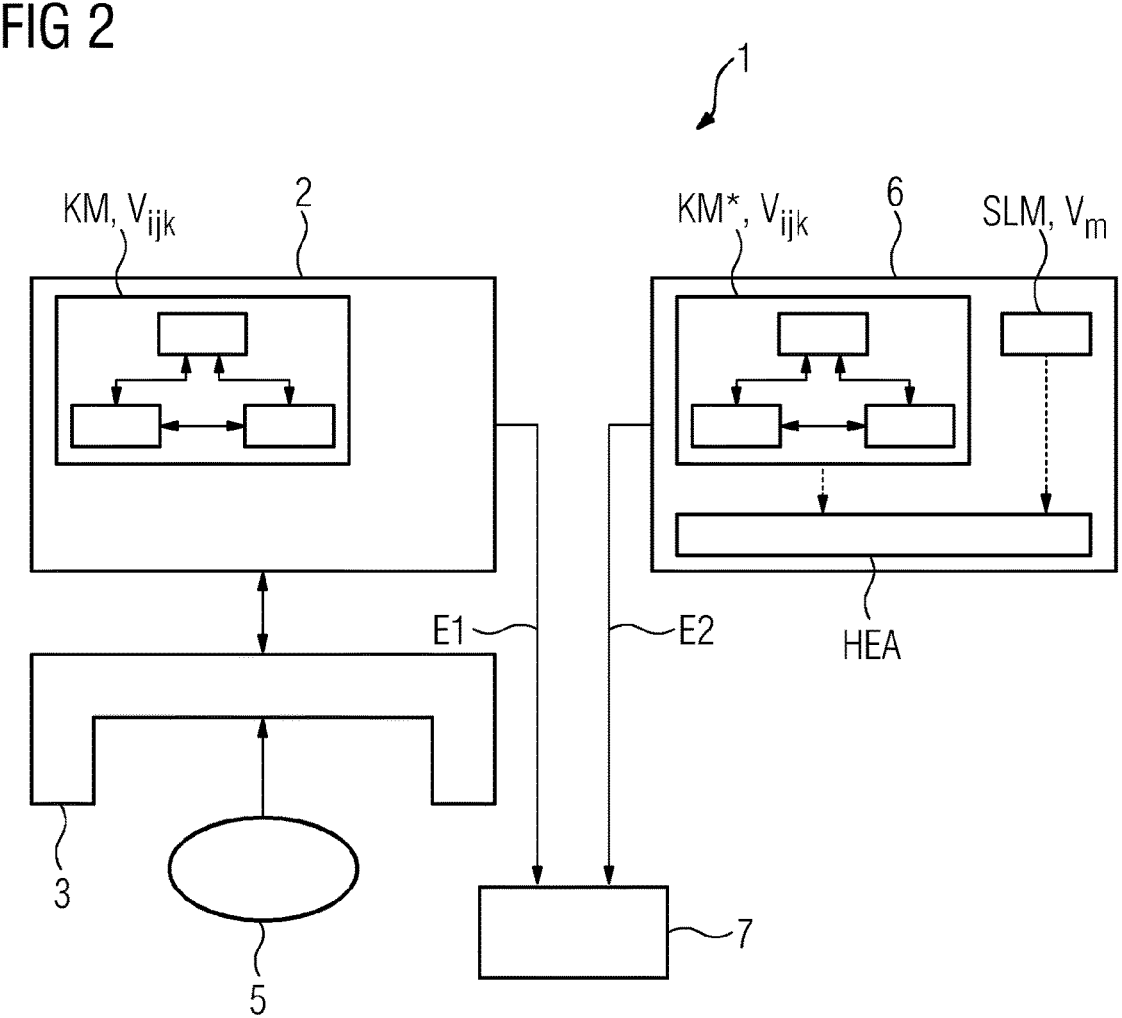
FIG. 2 shows a system according to the invention for validating an obstacle identification system, comprising a simulator and a validation device which provides an obstacle identification algorithm of the obstacle identification system, wherein said obstacle identification algorithm is to be validated.

FIG. 2 shows that, in addition to the combined model KM, a further submodel SLM is provided for the performance capability of sensors of the obstacle identification system, said model also being referred to as sensor performance capability model or abbreviated to sensor model in the following.

In the system 1 according to the invention, the combined model KM with its combinations $KV_{ijk}$ of the predetermined distributions $V_i$, $V_j$, $V_k$ of the submodels SM, WUM, HM forms the simulation model of a simulator 2 which is equipped with a user interface 3. On the basis of calculations on the combined model KM, the simulator 2 displays the driving scenarios graphically as computer graphics or as virtual reality. In this case, the virtual reality allows a test user 5 to interact with the simulated driving scenarios via the user interface 3 of the simulator 2. It is therefore possible in the context of a simulation study for various test users, in particular various trained locomotive drivers, to perform test runs at the simulator 2, 3. These test runs are performed in order to validate and then apply the submodels SM, WUM, HM and/or the combined model KM, and then by means of the simulator 2, 3, as a result of the simulation study, to generate and output a first result, which is assigned for test purposes and represents the obstacle identification capability of the test users 5.

In addition to the simulator 2 with its user interface 3, the system according to the invention also has a validation device 6. In addition to a form KM* of the combined model KM, said form KM* having undergone data conversion, and the further submodel SLM with its distributions $V_m$, the validation device 6 also provides an obstacle identification algorithm HEA of the obstacle identification system, which obstacle identification algorithm HEA is to be validated.

The combinations $KV_{ijk}$ provided from the combined model KM or from the converted form KM* of the combined model, said combinations being referred to as fixed combinations in the following, are therefore subjected both to the simulation by the simulator 2, 3 in order to perform the simulation study and to automatic processing by the obstacle identification algorithm HEA of the obstacle identification system of the validation device.

In addition to the result of the simulation study, which is output by the simulator 2, 3 as the first result E1 representing the obstacle identification capability of the test users 5, the second result E2 representing the obstacle identification capability of the obstacle identification algorithm HEA is output by the validation device 6 as a result of the automatic processing.

Furthermore, the system according to the invention comprises a test device 7, which is connected to the simulator 2, 3 and the validation device 6 and by means of which the result of the simulation study performed by the simulator 2, 3 and the result of the automatic processing performed by the validation device 6 are tested for agreement.

In other words, the submodels SM, WUM, HM are stochastically combined in the combined model KM, i.e. specific simulation conditions are determined on the basis of the predetermined distributions. For the purpose of validating the model, a statistically representative and significant sample of test users (locomotive drivers) are brought in for simulation runs. In this case, they are subjected in particular to exceptional situations including obstacles or unusual circumstances which are nonetheless selected from the fixed distributions.

Statistical distributions for the obstacle identification capability of the drivers, averaged over all fixed distributions, are produced as first result E1. It must be expected that these results will be better than in reality, since the drivers know that they must identify obstacles more frequently than in reality.

For the purpose of validating the technical obstacle identification system, the models SM, WUM and HM or the combined model KM are not used for a simulator, but instead undergo data conversion into the form KM* in order that the obstacle identification algorithm HEA can work directly on the computed driving scenarios. The model SLM is used in this case for the performance capability of the sensors (e.g. performance capability in respect of resolution, range, etc.).

This means that it is possible in particular to test the obstacle identification algorithm HEA automatically, and statistical distributions for the obstacle identification capability of the obstacle identification algorithm HEA are likewise obtained for the obstacle identification algorithm HEA in combination with the distributions of the sensor model SLM.

The test device 7 is then used, in particular with reference to known statistical methods such as e.g. the Kolmogorov-Smirnov test, to test whether the technical obstacle identification, i.e. in particular the obstacle identification algorithm HEA, is at least just as reliable as the human driver.

The invention claimed is:

1. A method for validating an obstacle identification system, which comprises the steps of:
   generating stochastic combinations of predetermined distributions from submodels for forming driving scenarios;
   subjecting the stochastic combinations both to simulation by a simulator to perform a simulation study and to automatic processing by an obstacle identification algorithm of an obstacle identification system; and
   automatically testing a result of the simulation study performed by the simulator and a result of the automatic processing for agreement.

2. The method according to claim 1, which further comprises stochastically combining the submodels in a combined model and the stochastic combinations from the combined model are provided.

3. The method according to claim 1, which further comprises displaying the driving scenarios graphically by the simulator during the simulation.

4. The method according to claim 2, wherein as a result of the simulation study during which the submodels and/or the combined model are validated and applied by means of simulation runs that are performed at the simulator by test users, a first result representing an obstacle identification capability of the test users is output.

5. The method according to claim 4, wherein as a result of the automatic processing, a second result representing the obstacle identification capability of the obstacle identification algorithm is output.

6. The method according to claim 1, which further comprises using a line section model, a weather and environment model and an obstacle model are as the submodels.

7. The method according to claim 1, which further comprises subjecting predetermined distributions of a further submodel to the automatic processing by the obstacle identification algorithm.

8. The method according to claim 7, which further comprises using a model for a performance capability of sensors of the obstacle identification system as the further submodel.

9. The method according to claim 3, which further comprises displaying the driving scenarios graphically by the simulator as a virtual reality during the simulation.

10. The method according to claim 4, wherein the test users are locomotive drivers.

11. A system for validating an obstacle identification system, comprising:
   a simulator having an interface, said simulator programmed to:
      provide stochastic combinations of predetermined distributions from submodels for forming driving scenarios;
      subject the stochastic combinations both to simulation by said simulator to perform a simulation study and to automatic processing by an obstacle identification algorithm of the obstacle identification system; and
      automatically test a result of the simulation study performed by said simulator and a result of the automatic processing for agreement.

12. The system according to claim 11, further comprising a combined model, in which the submodels are stochastically combined and which is suitably configured to provide the stochastic combinations.

13. The system according to claim 11, wherein said simulator is suitably configured to display the driving scenarios graphically during the simulation.

14. The system according to claim 12, wherein the system is suitably configured to output, as a result of the simulation study during which the submodels and/or the combined model are validated and applied by means of simulation runs that are performed at said simulator by test users, a first result representing an obstacle identification capability of the test users.

15. The system according to claim 14, wherein the system is suitably designed to output, as a result of the automatic processing, a second result representing the obstacle identification capability of the obstacle identification algorithm.

16. The system according to claim 11, wherein the system uses a line section model, a weather and environment model and an obstacle model as said submodels.

17. The system according to claim 11, wherein the system is suitably configured to submit further predetermined distributions of a further submodel to the automatic processing by the obstacle identification algorithm.

18. The system according to claim 17, wherein the further submodel is provided as a model for a performance capability of sensors.

* * * * *